Sept. 16, 1958　　　D. A. WHISENANT　　　2,851,939
PLOW SPRING LOADED FURROW WHEEL
Filed Nov. 10, 1954　　　　　　　　　　　　　　　3 Sheets-Sheet 1
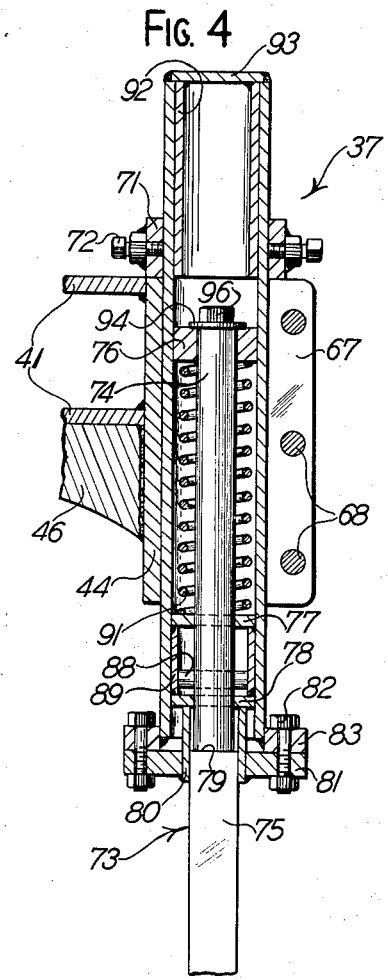
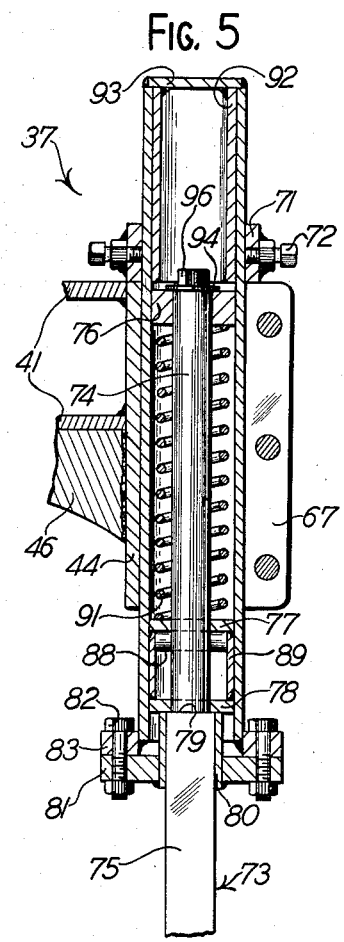
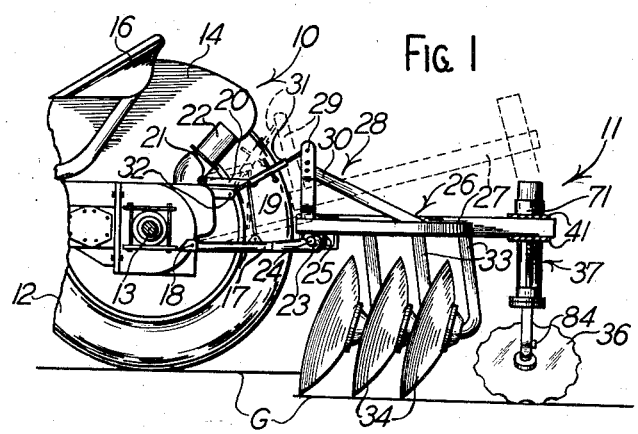
INVENTOR:
DEWEY A. WHISENANT
BY: Emerson B Donnell
ATTORNEY Sept. 16, 1958     D. A. WHISENANT     2,851,939
PLOW SPRING LOADED FURROW WHEEL
Filed Nov. 10, 1954                              3 Sheets-Sheet 2
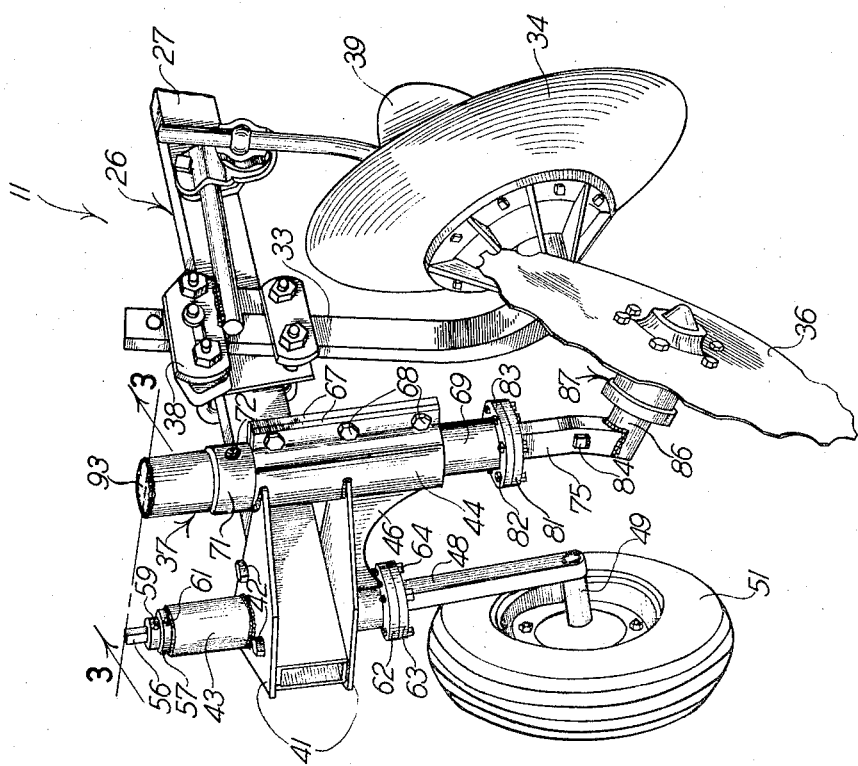
*INVENTOR:*
*DEWEY A. WHISENANT*
*BY: Emerson B Donnell*
      *ATTORNEY*

INVENTOR:
DEWEY A. WHISENANT
BY: Emerson B Donnell
ATTORNEY

United States Patent Office 2,851,939
Patented Sept. 16, 1958

2,851,939
PLOW SPRING LOADED FURROW WHEEL

Dewey A. Whisenant, Gadsden, Ala., assignor to J. I. Case Company, Racine, Wis., a corporation of Wisconsin Application November 10, 1954, Serial No. 467,937

12 Claims. (Cl. 97—53)

This invention relates to farm implements, and, more particularly, it relates to a plow spring loaded furrow wheel with a means for dampening the impact encountered in the wheel standard when raising the plow off the ground for transport thereof.

In certain types of present day plowing, it is desirable to have the plow furrow wheel spring loaded to insure ground engagement at all times. Thus, the plow might be raised during plowing because of encountering an obstacle or the like, but it is desired that the furrow wheel remain in full contact with the ground to properly guide the plow. An extendable and retractable furrow wheel is employed to accomplish the function of keeping the furrow wheel in contact with the ground. However, upon lifting the entire plow off the ground, the furrow wheel standard will drop in its housing to impact against the bottom point with a force sufficient to damage parts of the plow. Therefore, it is a primary object of this invention to provide a plow furrow wheel with a means for dampening the impact encountered in raising the plow off the ground for transport thereof.

Another object of this invention is to provide a spring loaded plow furrow wheel which will maintain continuous contact with the ground during plowing.

Another object is to provide a plow furrow wheel which is spring loaded and permits vertical adjustment of the wheel standard and directional adjustment of the wheel.

Another object is to provide a spring loaded furrow wheel for use in combination with a ground penetration gage wheel.

Other objects and advantages will become apparent upon reading the following description in conjunction with the accompanying drawings, wherein, Fig. 1 is a side elevational fragmentary view of a tractor and a plow with the latter containing a preferred embodiment of this invention.

Fig. 2 is an enlarged fragmentary rear perspective view of the plow shown in Fig. 1.

Fig. 4 is a sectional view of a fragment of the view of Fig. 3 with the parts thereof in a different position.

Fig. 5 is a view similar to Fig. 4 but with the parts in another different position.

Similar reference numerals refer to similar parts throughout the several views.

Figure 3:
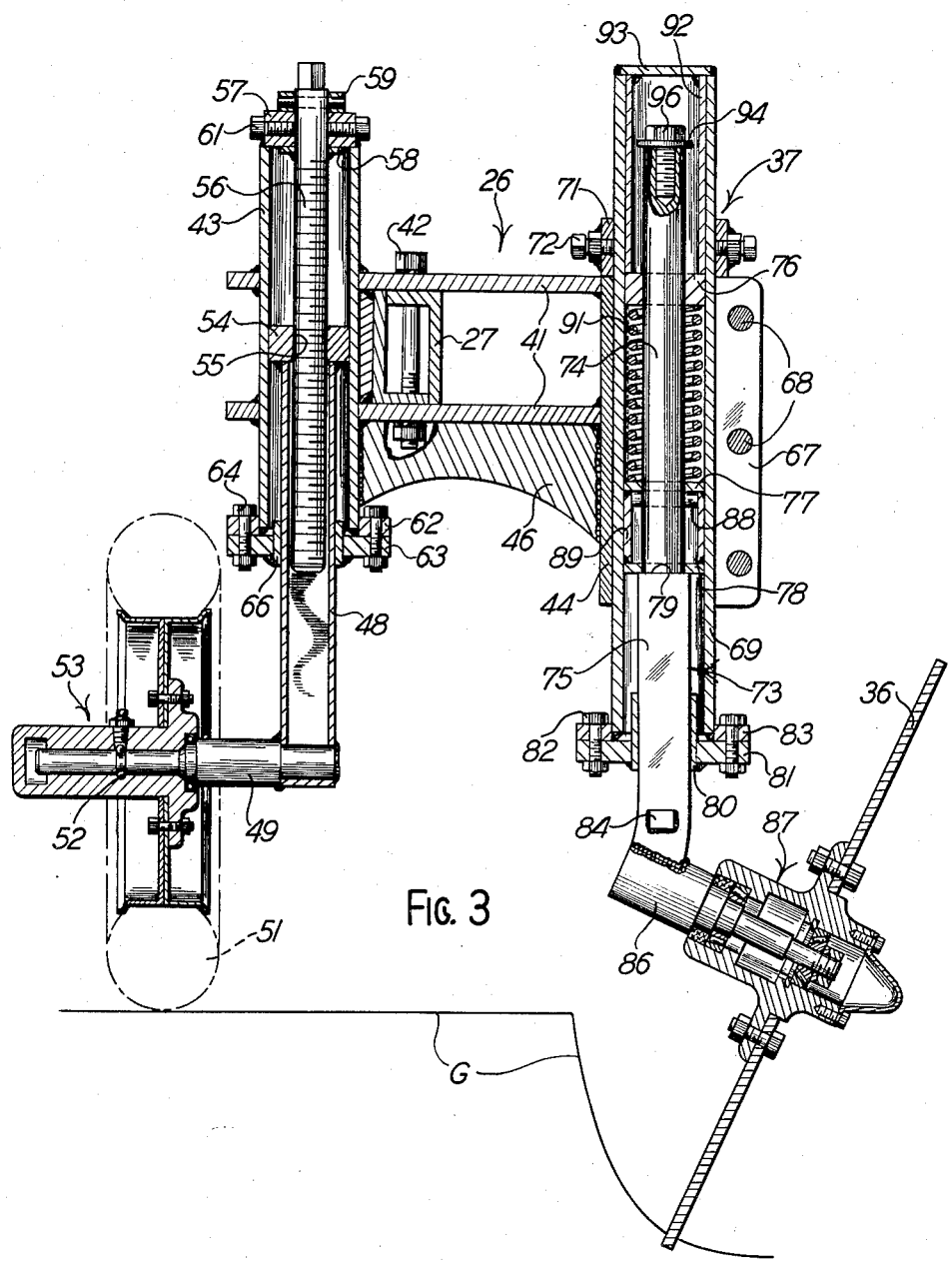
Fig. 3 is an enlarged sectional view taken on the line 3—3 of Fig. 2.

Fig. 1 shows a rear end fragment of a tractor 10 having the major part of a disc plow 11 attached thereto. The tractor includes the usual two rear wheels, such as the wheel 12, with the wheel on the near side of the tractor removed to facilitate showing the attachment. Thus, the rear wheel axle 13 is shown sectioned and it rotatably supports the wheels. The latter are usually covered by fenders, such as the fender 14, and an operator's seat 16 is mounted on the tractor intermediate the wheels. A pair of hitch arms, such as the arm 17, is pivotally attached at 18 to the rear of the tractor in a conventional manner. The usual connecting link 19 is attached to each of the arms 18 and to the tractor through an arm 20. The latter is pivotally attached to the tractor at 21 with the usual hydraulic power connection to power operate the hitch arms 17 to raise and lower the latter through the hydraulic power cylinder 22. The rearward ends of the arms 17 are each provided with the usual upturned connectors 23 for receiving a drawbar hitch pin 24 in each of the laterally spaced apart connectors 23, in the usual manner. A drawbar 25 is thus supported by the arms 17 to extend horizontally transversely at the rear of the tractor.

Attached to the drawbar is a plow frame 26 consisting of a beam 27 and a mast 28. The latter comprises an upright 29 and a rearward brace 30 suitably attached between the top of the upright and a mid-point of the beam 27. Also, the upper end of the upright is pivotally attached to an adjustable turnbuckle 31 which is pivotally attached to the tractor at 32 in the usual manner.

With the foregoing described arrangement, the usual three point 10 connection is provided at the rear end of the tractor. Thus, operation of the hydraulic cylinder 22 will raise the hitch arms 17 from the solid line position shown to the dotted line position. Correspondingly, the turnbuckle is pivoted and the mast 28 is raised, along with the entire disc plow 11, so that the plow is moved from the lower plowing position to the raised transport position.

Also attached to the beam 27 are a plurality of standards 33 which depend therefrom to each rotatably support a disc 34, the ground tilling member, in the usual manner. The rear end of the frame 26 has a furrow wheel 36 attached through a mounting 37 to depend from the frame beam in a construction fully described hereinafter. As indicated in Fig. 1, the usual ground line "G" is formed, as shown, during the operation of the plow, and Fig. 3 shows the ground line with the furrow wheel 36 in the furrow to counter the side thrust on the plow in operation. The wheel 36 is preferably of the thin coulter type to slightly penetrate the ground and it is inclined, as shown.

Fig. 2 shows the rear end of the frame 26 with the standard 33 clamped thereto between plates 38 in a well-known manner. Also, the usual disc scraper 39 is attached to the beam 27 to be positioned on the face of the disc 34. Further shown is that the rear end of the beam 27 has a pair of upper and lower plates 41 horizontally attached thereto by two bolts 42 which pass through the plates and the beam. The plates 41 have two vertically disposed tubular housings 43 and 44 welded thereto, as also shown in Fig. 3. A supporting web 46 is welded between the housings, as shown, to stabilize the structure. The housing 43 extends above the plates 41 to support a vertically disposed hollow square standard 48 projecting below the lower end of the housing. The lower end of the standard 48 has a circular axle 49 welded to it to be offset and horizontal. A ground engaging wheel 51 is rotatably mounted on the axle 49 with the usual ball bearings 52, and hub and rim assembly 53, as shown. The wheel 51 is maintained directed in the path of travel of the plow and it serves as a gage wheel regulating the depth of ground penetration of the discs 34.

As indicated in Fig. 3, the wheel 51 rides on the unplowed ground line "G" while the furrow wheel 36 rides at a lower level of the ground line in the furrow. Further, the standard 48 is vertically adjustable with respect to the plow frame. Thus, the upper end of the standard has a circular collar 54 welded to it to be axially slidable within the housing 43. The collar is threaded internally at 55 to engage the threads shown on a screw 56 which projects into the standard 48 to a point beyond the bottom of the housing 43. The upper end of the screw 56 is journaled in a collar 57 which is welded to the upper edge of the housing 43 and a stop washer 58 is welded to the screw to abut the bottom of the collar 57. A pin and collar 59 are axially secured to the top of the screw to abut the top of the collar 57, the whole constituting a thrust bearing for screw 56. In this manner, the screw is axially fixed, with respect to the housing 43, but it is free to rotate therein except that set screws 61 in the collar 57 can be tightened against the screw and prevent rotation of the latter.

The lower end of the housing 43 has a washer or flange 62 welded thereto for the purpose of removably attaching a second washer or head 63 below the washer 62 by bolts 64. A square sleeve 66 is welded to the washer 63 to slidably receive the standard 48. Since the sleeve 66 and the standard 48 are both square, the latter cannot rotate in the housing 43. Also, the collar 54 cannot pass from the lower end of the housing 43 because of the sleeve 66 and the washer or head 63.

With the foregoing described structure, the plow is vertically adjustable upon rotation of the screw. The adjustment regulates the depth of penetration of the disc plow into the ground.

The opposite sides of the plates 41 also secure the housing 44 which retains the furrow wheel 36. In this instance, the housing 44 is provided with a pair of flanges 67 which are drawn together by bolts 68 to cause the housing to clamp an inner tubular housing 69 therewithin. The housing 69 can then be adjusted vertically and rotated about its vertical axis by loosening of the bolts 68. Correspondingly, the furrow wheel 36 is vertically adjustable and it can be directed as desired. Since the furrow wheel counteracts side draft on the plow or the force of plowing, by steering or directing the wheel slightly to the right in the forward movement of the tractor and plow, a greater side draft will be resisted by the furrow wheel. To lock the housing 69 for security against downward movement in the housing 44 during transportation of the plow, for instance, a collar 71 encircles an upper section of the housing and set screws 72 can be screwed against the housing to lock therewith while the collar 71 abuts the upper edge of the housing 44 to effect a stop. Of course, the set screws 72 must be loosened to permit downward adjustment of the housing 69.

A standard 73 is axially disposed within the housing with a circular upper end portion 74 and a square lower end portion 75. The portion 74 is surrounded by a guiding collar 76 which slidably receives the portion 74 while an abutment 77 and a thrust collar 78 slidably receive the lower end of the portion 74. The top edge of the portion 75 forms, with portion 74, a shoulder 79 to abut the thrust collar 78, as shown. Also, the standard portion 75 is received in a square opening in a sleeve, stop and guideway 80 which sleeve is welded to a head 81 bolted, by bolts 82, to a flange 83 welded to the lower edge of the housing 69.

A lower end of the standard 73 is provided with a projection 84 welded thereto to extend outwardly from the standard and prevent the latter from entering the housing 69 at a point beyond the projection 84 by abutting the lower edge of the sleeve 80. Also, the furrow wheel 36 is rotatably mounted on an axle 86 welded obliquely to the lower end of the standard. The usual wheel hub and bearing assembly 87 are employed.

The standard portion 74 is provided with a pin or stop 88 which passes through the standard to project on diametrically opposite sides thereof. A sleeve or spacer 89 is slidably positioned within the housing 69 to enclose the ends of the pin 88 and serve as a spacer between the abutment 77 and the thrust collar 78 with the three members welded together, as shown. A compression coil spring 91 is loosely disposed within the housing 69 between the collar 76 and the abutment 77 which are at all times the end supports for the spring. Positioned in the housing 69 and above the guiding collar 76 is a spacer sleeve or stop means 92 which limits the upward movement of the guiding collar 76, and thus the spring, to the position shown in Fig. 3. The top of the housing 69 has a cover plate 93 welded thereto to close the housing and be welded to the sleeve to secure the latter in position.

The wheel mounting is complete with the provision of a stop, or washer 94 bolted to the upper edge of the standard 73 by a bolt 96 and projecting therefrom to form a flange on the standard. The construction is such that downward movement of the standard causes the flange to abut the guiding collar 76.

With the foregoing described construction, a spring loaded furrow wheel is provided. The wheels 36 and 51 guide and support the rear end of the plow 11 over the ground. Thus, as shown in Fig. 3, the plow weight forces the housing 69 downwardly to where the spring 91 is compressed between the collar 76 and the abutment 77. The abutment 77 and the thrust collar 78 respectively ride on the pin 88 and the standard shoulder 79. In this manner, the spring is interposed between the collar 76 and sleeve 92 of housing 69, and the pin 88, sleeve 89 and shoulder 79 of the standard 73. Since the furrow wheel 36 is spring loaded, it will be in desired contact with the ground at all times, even when the rear end of the plow is raised by the riding of the land wheel 51 over a rise or by the plow discs encountering a rise in the ground. Also, vertical adjustment of the wheel 51 through the screw 56 will be accommodated by the spring loaded furrow wheel which will automatically compensate for the change, or an adjustment of the entire housing 69 can be made. Vertical adjustment of the housing will affect the loads on the spring 91 as the furrow wheel is pressed more or less into the furrow with respect to a single setting of the gage wheel.

An important feature of this invention is the avoidance of the impact normally encountered by the standard 73 when sliding down in the housing 69 as the plow is raised off the ground for transport. In this operation, the standard initially falls from the ground engaging position of Fig. 3 to the position of Fig. 4 as the impact or spacer sleeve 89 is carried downwardly by the standard 73 and is forced downwardly by the spring 91 to where the thrust collar 78 abuts the square sleeve or guide 80. The standard has then moved downwardly to where the pin 88 has moved down with respect to the abutment 77, so that the standardd is momentarily supported by the upward pressure of spring 91 against guide collar 76. Also, the flange 94 has engaged the guiding collar 76 to move the latter downwardly, as shown. In this initial move, the standard is still spring loaded as the flange 94 engages the collar 76 since it is preferred that the dimension from the top of the guiding collar 76 to the bottom of the thrust collar 78 be less than the dimension from the top of the sleeve 80 to the bottom of the sleeve or stop means 92 with spring 91 in its fully extended position.

As shown in Fig. 4, the spring 91 is then supported on the abutment 77 and it forces upwardly on the collar 76 and the flange 94. This condition obtains momentarily, after which pin 88 is returned to the underside of the abutment 77, as shown in Fig. 5, and the structure remains that way during transport of the plow. Any bouncing of the plow will not affect any connection employed between the standard and the frame such as the pin 88. When the plow is again lowered onto the ground, the parts return to the position of Fig. 3.

Thus, the spring 91 acts upwardly on the plow frame and downwardly on the standard when the plow is in a ground engaging position. Also, the spring acts downwardly on the plow frame and upwardly on the standard when the plow is in the raised position off the ground. Thus, the spring acts between the plow frame and the standard at all times. In the transition between these two phases, the spring absorbs energy of the inertia of the falling standard. Once the impact sleeve or space 89 reaches the position of Fig. 4, the spring is not increasing that inertia since the spring can not move further down and is instead acting upwardly on the standard.

While a specific embodiment of this invention has been shown and described, the scope of this invention should be limited only by the appended claims.

I claim:

1. A plow comprising a frame adaptable to be draft connected to a tractor at the front end thereof, a ground plowing member attached to said frame to be disposed therebelow and form a furrow in the ground, a releasable clamping means attached to said frame, a wheel standard housing attached to said frame to be vertically adjustable and axially rotatable in said clamping means when said clamping means is loosened, a wheel standard vertically disposed within said housing, means on said standard for maintaining the latter in axially rotated relation with respect to the axially rotated position of said housing, a furrow wheel rotatably mounted on the lower end of said standard to be disposed in a furrow formed by said plowing member to resist the lateral force of plowing, and a compression spring disposed within said housing to be operable between said housing and said standard to continuously yieldingly urge the latter downwardly to cause said furrow wheel to be in constant ground engagement during plowing.

2. A plow comprising a frame adaptable to be draft attached to a tractor, a ground tilling member attached intermediate on said frame to depend therefrom and engage the ground to form a furrow therein, a releasable clamping means attached to said frame, a generally cylindrical vertically disposed housing engaged in said clamping means to be vertically adjustable and rotatable about the vertical axis therein when said clamping means is loosened, said housing having a vertically disposed rectangular opening, a standard vertically movably disposed in said housing and including a rectangular portion slidably received in said rectangular opening for maintaining said standard fixed in a rotative position about the vertical axis with respect to said housing, a furrow wheel rotatably mounted on the lower end of said standard to be aligned with a furrow, two spaced apart stops on said standard, a collar on said standard between said stops and slidable on said standard and in said housing to an upper limit position, a stop on said housing below said stops on said standard for limiting downward movement of the latter, and resilient means disposed in said housing between said collar and the lower one of said stops on said standard to be operative between said housing and said standard to yieldingly urge said furrow wheel in a ground engaging direction.

3. A plow comprising a frame adaptable to be draft connected at the front end thereof to a tractor and to be raised off the ground by said tractor, a ground plowing member attached to a mid-portion of said frame to be disposed therebelow and form a furrow in the ground upon forward movement, a gage wheel attached to said frame to support the rear end of said plow on the ground at a point offset from said plowing member to regulate the depth of ground penetration by said plowing member, a vertically disposed housing attached to the rear end of said frame, a wheel standard vertically and movably disposed within said housing, a furrow wheel rotatably mounted on the lower end of said standard to be disposed in a furrow formed by said plowing member to resist the lateral force of plowing, means disposed within said housing to continuously yieldingly urge said standard downwardly during plowing to cause said furrow wheel to be in constant ground engagement, means disposed within said housing to dampen the impact of said standard falling when the said plow is raised off the ground, and stop means on said standard and engageable with said housing to limit the movement permitted by said dampening means.

4. A plow comprising a frame adaptable to be draft connected at the front end thereof to a tractor, a ground plowing member attached to said frame to be disposed therebelow to form a furrow in the ground, releasable clamping means attached to the rear end of said frame, a generally cylindrical substantially vertically disposed housing engaged in said clamping means and angularly adjustable therein when said clamping means is released, said housing having a vertically disposed opening of angular configuration therein, a wheel standard disposed within said housing opening and having a configuration interfitting with said angular opening, a furrow wheel rotatably mounted on the lower end of said standard to be disposed in a furrow formed by said plowing member to resist the lateral force of plowing, and a compression spring disposed within said housing between said standard and said housing to continuously yieldingly urge said standard downwardly during plowing to cause said furrow wheel to be in constant ground engagement.

5. A plow comprising a frame adaptable to be draft connected at the leading end to a tractor and to be raised by said tractor, a ground wheel attached to the trailing end of said frame to depend offset therefrom and support said plow on the ground, a disc attached to said frame intermediate said leading end and said trailing end to depend therefrom and engage the ground to form a furrow therein, clamping means on the trailing end of said frame, a housing engaged in said clamping means and adjustable therein when said clamping means is loosened, said housing having a vertically disposed opening, an upper stop and a lower stop on said housing within said opening, a wheel standard disposed in said opening to be vertically movable therein, a furrow wheel rotatably mounted on the lower end of said standard to be vertically aligned with a furrow, a first stop on the upper end of said standard positioned above said housing upper stop, a second stop on said standard positioned above said housing lower stop, a spring disposed in said housing to surround said standard to exert a force between said housing upper stop and said standard second stop and thereby yieldingly urge said standard downwardly to continuously urge said furrow wheel into a furrow during plowing and with said spring disposed to exert a force between said housing lower stop and said standard first stop and thereby yieldingly urge said standard upwardly when said plow is raised and said standard has moved downwardly in said housing.

6. A plow comprising a frame adaptable to be draft connected at a leading end thereof to a tractor and to be raised by said tractor, a ground wheel attached to the trailing end of said frame to depend offset therefrom and support said plow on the ground, a disc attached to said frame intermediate said leading end and said trailing end to depend therefrom and engage the ground to form a furrow therein, a housing attached to the trailing end of said frame and having a vertically disposed opening, a standard loosely received in said opening to be vertically disposed and movable therein, a furrow wheel rotatably attached to the lower end of said standard to be vertically aligned with a furrow, an upper projection and a lower projection spaced apart on said standard, an upper stop and a lower stop spaced apart in said housing opening with said lower stop below said lower projection, a spacer disposed in said housing opening adjacent said standard lower projection to abut said lower stop in a downward position of said standard, a coil spring disposed in said housing opening to encircle said standard to extend axially therealong above said spacer with the top end of said spring abutting the lower of either said upper projection or said upper stop whereby said spring yieldingly urges downwardly on said standard when the latter is in an upper position in said housing and abutting said upper stop and whereby said spring yieldingly urges upwardly on said standard when the latter is in a downward position in said housing and abutting said upper projection.

7. A plow comprising a frame adaptable to be draft connected at a leading end thereof to a tractor and adaptable to be raised by said tractor, a ground wheel attached to the trailing end of said frame to depend offset therefrom and support said plow on the ground, a ground tilling member attached to said frame intermediate said leading end and said trailing end to depend therefrom and engage the ground to form a furrow therein, a housing attached to the trailing end of said frame and having a vertically disposed opening, a standard disposed in said opening to be vertically disposed and vertically movable therein, a furrow wheel rotatably attached to the lower end of said standard to be vertically aligned with said furrow, a flange on the upper end of said standard, a pin projecting through said standard and axially spaced thereon below said flange, a sleeve loosely disposed around said standard to enclose said pin to be axially movable with respect to said standard within limits of the top and the bottom of said sleeve, a coil spring disposed on said standard to abut the top of said sleeve and extend thereabove, a stop in said housing opening below said sleeve to limit downward movement of the latter, a stop in said housing opening above said sleeve to limit upward extension of said spring whereby said standard is yieldingly urged downwardly by said spring when said plow is engaged with the ground and said standard is yieldingly urged upwardly by said spring when said plow is raised.

8. A plow comprising a frame adaptable to be towed and raised by a tractor, a ground tilling member attached to said frame to depend therefrom, a gage wheel attached to said frame to depend offset therefrom and support said plow on the ground and gage the ground penetration of said tilling member, a furrow wheel mounted on said frame to the rear of said tilling member to engage the ground to counter the side thrust of tilling, a compression spring disposed between said frame and said furrow wheel whereby the latter is spring loaded to continuously yieldingly urge said wheel downwardly into ground engagement during tilling, a lost motion means including a stop operable between said furrow wheel and said spring, and said stop being positioned to engage said frame so as to define a lower limit of movement of said furrow wheel relatively to said frame, said lost motion means being positioned to engage said frame to support said spring on said frame and dampen the impact of said furrow wheel on said frame when said plow is raised.

9. In a wheel construction for use in a ground working implement having a frame, the combination of a housing mounted on said frame and providing a substantially vertical cylindrical bore and said housing being selectively rotatable about the axis of said bore with respect to said frame, said housing being provided with a lower head, said head being shaped to provide a guideway of geometric cross section, a wheel standard slidably and non-rotatably guided in said guideway and extending upwardly into said cylindrical bore, a collar on said standard spaced upwardly from said head and slidably guided in said cylindrical bore, a ground engaging furrow wheel journaled on said standard at a point below said head, and spring means above said head engaged with said standard and constituted to control the position of said standard axially of said cylindrical bore.

10. In a wheel construction for use in a ground working implement having a frame, the combination of a housing rigidly mounted on said frame and providing a substantially vertical cylindrical bore, said housing being provided with a lower head, said head being shaped to provide a guideway of geometric cross section, a wheel standard slidably and non-rotatably guided in said guideway, extending upwardly into said cylindrical bore and having a shoulder disposed therein, a guiding collar slidable on said standard, spaced upwardly from said shoulder and slidably guided in said cylindrical bore, a flange on said standard above said guiding collar, a ground engaging wheel journaled on said standard at a point below said head, a thrust collar slidable on said standard, above and engageable with said shoulder, a stop on said standard spaced above said thrust collar, an abutment slidable on said standard above said stop, spring means compressed between said guiding collar and said abutment and tending to force the latter against said stop, spacer means extending between said abutment and said thrust collar, and means fixed in said cylindrical bore and positioned to contact and arrest upward movement of said guiding collar whereby to provide resilient downward pressure on said standard and upward pressure on said housing as a result of the expansive pressure of said spring means against said abutment and said guiding collar, respectively.

11. In a wheel construction for use in a ground working implement having a frame, the combination of a housing rigidly mounted on said frame and providing a substantially vertical cylindrical bore, said housing being provided with a lower head, said head being shaped to provide a guideway of geometric cross section, a wheel standard slidably and non-rotatably guided in said guideway, extending upwardly into said cylindrical bore and having a shoulder disposed therein, a guiding collar on said standard, spaced uwardly from said shoulder and slidably guided in said cylindrical bore, a ground engaging wheel journaled on said standard at a point below said head, a thrust collar slidable on said standard, above and engageable with said shoulder, a stop on said standard spaced above said thrust collar, an abutment slidable on said standard above said stop, spring means compressed between said guiding collar and said abutment and tending to force the latter against said stop, spacer means extending between said abutment and said thrust collar, and means fixed in said cylindrical bore and positioned to arrest upward movement of said standard whereby to provide downward pressure on said standard and upward pressure on said housing, and, as a result of the expansive pressure of said spring means against said abutment and said guiding collar, resilient cushioning of downward movement of said standard by reason of the upward pressure of said spring means against said guiding collar, at such times as said stop is relieved of the downward pressure of said spring means by downward movement of said standard when said thrust collar is in contact with said head.

12. In a wheel construction for use in a ground working implement having a frame, the combination of a housing rigidly mounted on said frame and providing a substantially vertical bore, said housing being provided with a lower head, a wheel standard slidably guided in said lower head, extending upwardly into said bore and having a shoulder disposed therein, a guiding collar slidable on said standard, spaced upwardly from said shoulder and slidably guided in said bore, flange means on said standard above said guiding collar, a ground engaging wheel journalled on said standard at a point below said head, a thrust collar slidable on said standard, above and engagable with said shoulder, spring means on said standard within said bore and arranged to exert upward pressure on said guiding collar and downward pressure against said thrust collar, tending to maintain it against said shoulder, and means fixed in said bore and positioned to contact and arrest upward movement of said guiding collar whereby to provide resilient downward pressure on said standard and upward pressure on said housing as a result of the expansive pressure of said spring means against said thrust collar and said guiding collar respectively.

References Cited in the file of this patent

UNITED STATES PATENTS 273,508     Garst _____ Mar. 6, 1883

(Other references on following page)

UNITED STATES PATENTS

| | | |
|---|---|---|
| 319,499 | Marshall | June 9, 1885 |
| 726,447 | McDonnell | Apr. 28, 1903 |
| 1,228,682 | McCabe | June 5, 1917 |
| 2,372,214 | Loepsinger | Mar. 27, 1945 |
| 2,406,484 | Allen | Aug. 27, 1946 |
| 2,676,526 | Dodson | Apr. 27, 1954 |
| 2,704,496 | Taylor | Mar. 22, 1955 |

FOREIGN PATENTS

| | | |
|---|---|---|
| 20,340 | Great Britain | of 1910 |
| 705,894 | Great Britain | Mar. 17, 1954 |